US007481303B2

(12) United States Patent
Matsuzaki

(10) Patent No.: US 7,481,303 B2
(45) Date of Patent: Jan. 27, 2009

(54) MULTI-POT TYPE DISC BRAKES

(75) Inventor: Yoshiki Matsuzaki, Farmington Hills, MI (US)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/978,627

(22) Filed: Oct. 30, 2007

(65) Prior Publication Data

US 2008/0116021 A1 May 22, 2008

(30) Foreign Application Priority Data

Nov. 17, 2006 (JP) ............................. 2006-311563

(51) Int. Cl.
*F16D 65/20* (2006.01)
(52) U.S. Cl. ..................... 188/72.5; 188/72.4
(58) Field of Classification Search ............... 188/72.5, 188/238–240, 72.4
See application file for complete search history.

(56) References Cited

U.S. PATENT DOCUMENTS

| 3,424,276 | A | * | 1/1969 | Robinette | 188/72.2 |
| 3,910,385 | A | * | 10/1975 | Gardner | 188/73.43 |
| 4,494,630 | A | * | 1/1985 | Stoka et al. | 188/71.8 |
| 5,277,279 | A | * | 1/1994 | Shimura | 188/72.5 |
| 5,620,063 | A | * | 4/1997 | Smith | 188/73.2 |
| 5,964,321 | A | * | 10/1999 | Hinkens | 188/72.4 |
| 6,000,506 | A | * | 12/1999 | Warwick | 188/73.31 |
| 7,213,688 | B2 | * | 5/2007 | Hendrich et al. | 188/71.5 |
| 2006/0175156 | A1 | * | 8/2006 | Sato et al. | 188/73.47 |

FOREIGN PATENT DOCUMENTS

JP    2005-9612 A    1/2005

* cited by examiner

*Primary Examiner*—Christopher P Schwartz
(74) *Attorney, Agent, or Firm*—Buchanan Ingersoll & Rooney PC

(57) ABSTRACT

One aspect of the present invention can include a disc brake having a first and second piston capable of pushing a pad towards a disc rotor, and a caliper having a first and second cylinder for housing the first and second pistons. Further, each first and second cylinder includes a bottom and a groove positioned proximate the bottom, the groove on the first cylinder is smaller than the groove on the second cylinder in the axial direction, also the first piston associated with the first cylinder has a smaller allowable inclination angle for the caliper than the second piston.

11 Claims, 5 Drawing Sheets

MULTI-POT TYPE DISC BRAKES

This application claims priority to Japanese patent application serial number 2006-311563, the contents of which are incorporated herein by reference.

BACKGROUND OF THE INVENTION

1. Field of the Invention

The present invention relates to a multi-pot type disc brake including a plurality of pistons for pushing pads to a disc rotor, and a caliper having a plurality of cylinders juxtaposed for accommodating the pistons.

2. Description of the Related Art

A multi-pot type disc brake includes a plurality of pistons, and a caliper having a plurality of cylinders (or pots) juxtaposed for accommodating the pistons. Generally, the cylinders are formed into such an identical shape that all the clearances between the inner circumferences of the cylinders and the outer circumferences of the pistons are equal. In case the wears of the pads are uneven, all the pistons rub the cylinders simultaneously at a braking time. This creates a problem of an abrupt increase in sliding resistances of the pistons to the cylinders. Thus, at the brake ending time, it is difficult for the pistons to return to the positions before the braking actions so that the pads cannot sufficiently leave the disc rotors at a non-braking time. Another problem is the dragging phenomenon, in which the pads are in sliding contact with the disc rotor at the non-braking time.

In the conventional art, another disc brake is known in JP-A-2005-9612. This disc brake includes a caliper, in which cylinders for accommodating pistons on a rotor rotation-inlet side and cylinders for accommodating pistons on a rotor rotation-outlet side are juxtaposed to each other. The clearance between the cylinder and the piston on the rotor rotation-outlet side is made larger than that on the rotor rotation-inlet side. Even in the case where the caliper is deformed to bulge at the braking time, the pistons on the rotor rotation-outlet side are prevented from rubbing the cylinders on the rotor rotation-outlet side. As a result, the difference between the thrusts of the pistons on the rotor rotation-inlet side and the pistons on the rotor rotation-outlet side can be suppressed to reduce the uneven wears of the pads.

Because of the large clearances between the cylinders on the rotor rotation-outlet side and the pistons, however, a problem arises in that the durability of the sealing members for sealing those clearances is degraded. On the other hand, the pistons are usually plated on their surfaces with chromium or nickel for preventing damages. As shown in FIG. 5, therefore, the piston 13 is inclined with respect to the cylinder 12a, and its bottom 13a is liable to come into sliding contact with the inner circumference of the cylinder 12a thereby forming a pit 12a2 in the inner circumference 12a1 of the cylinder 12a. As a result, the pit 12a2 makes if more difficult for the piston 13 to move relative to the cylinder 12a and the piston 13, after the braking ends, to return to the position before the braking actions. This raises another problem of the dragging phenomenon of pads 15 by a disc rotor R.

Thus, there is a need in the art for a disc brake, which is constituted to suppress the development of the uneven wear of the pads without degrading the durability of the seal between the cylinder and the piston and to suppress the dragging phenomenon of the pads by the disc rotor.

SUMMARY OF THE INVENTION

One aspect of the present invention can include a multi-pot type disc brake including a plurality of pistons for pushing a pad to a disc rotor and a caliper having a plurality of cylinders for housing the pistons. Each of the cylinders may have a groove formed in an area close to its bottom for enlarging the cylinder diameter. Further, one of the grooves may be smaller than the other groove or grooves in the axial direction from the bottom of the cylinders, so that the piston inserted into the cylinder having the smaller groove may have a smaller allowable inclination angle for the caliper than the other piston or pistons.

Therefore, the pistons are adjusted in the allowable inclination angles by the axial lengths of the grooves formed in the cylinders. Moreover, the piston having the smallest allowable inclination angle can suppress the inclination of the pad. As a result, that piston can suppress the uneven wear of the pad. On the other hand, the other piston hardly rubs the cylinder so that the pistons can restore to the pre-braking position more easily after the braking time, as compared to the case where all of a plurality of the pistons rub the cylinders. As a result, it is possible to suppress the dragging phenomenon of the pads by the disc rotor.

DETAILED DESCRIPTION OF THE INVENTION

Each of the additional features and teachings disclosed above and below may be utilized separately or in conjunction with other features and teachings to provide improved multi-pot type disc brakes. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
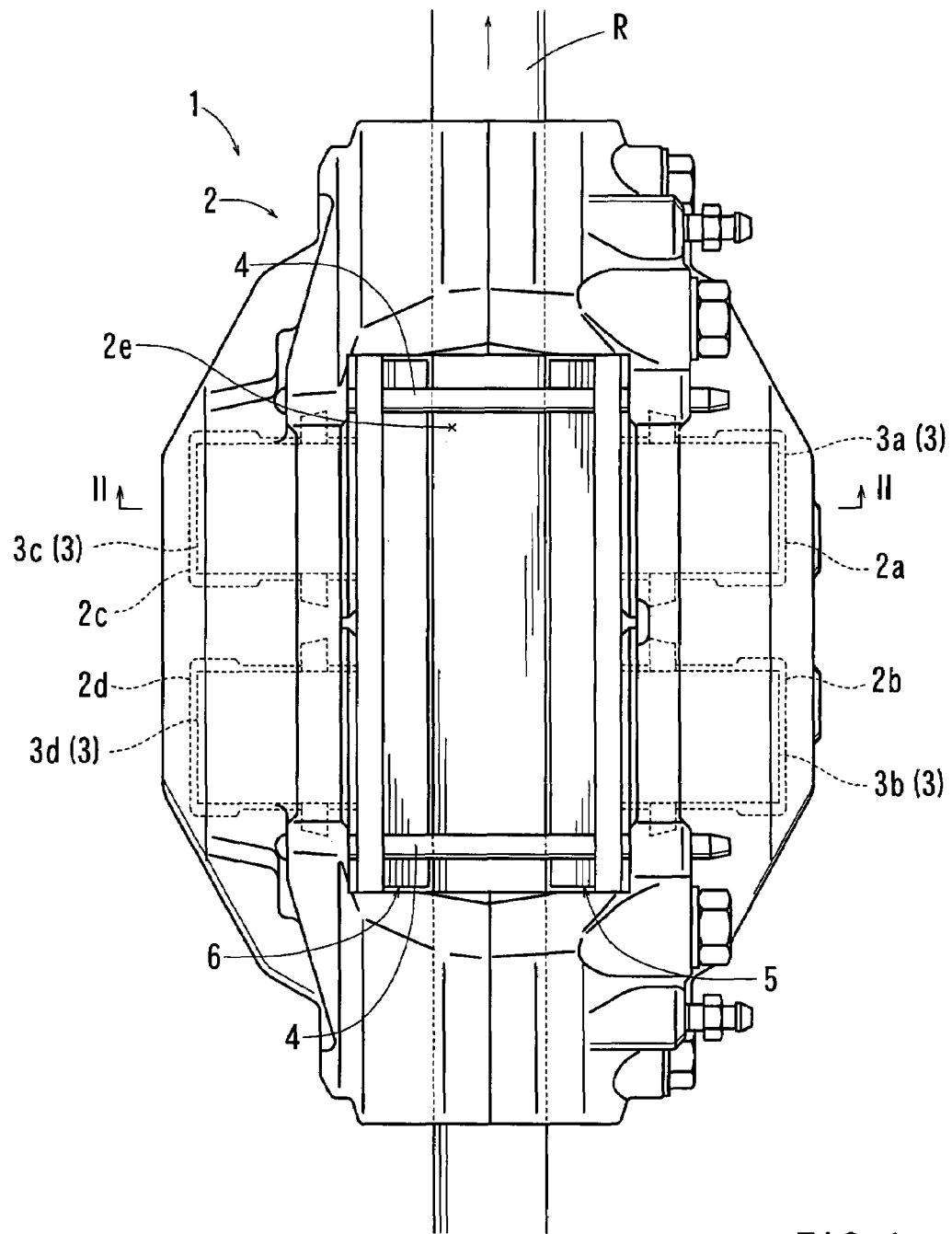
FIG. 1 is a top view of a disc brake of the present invention.
Figure 2:
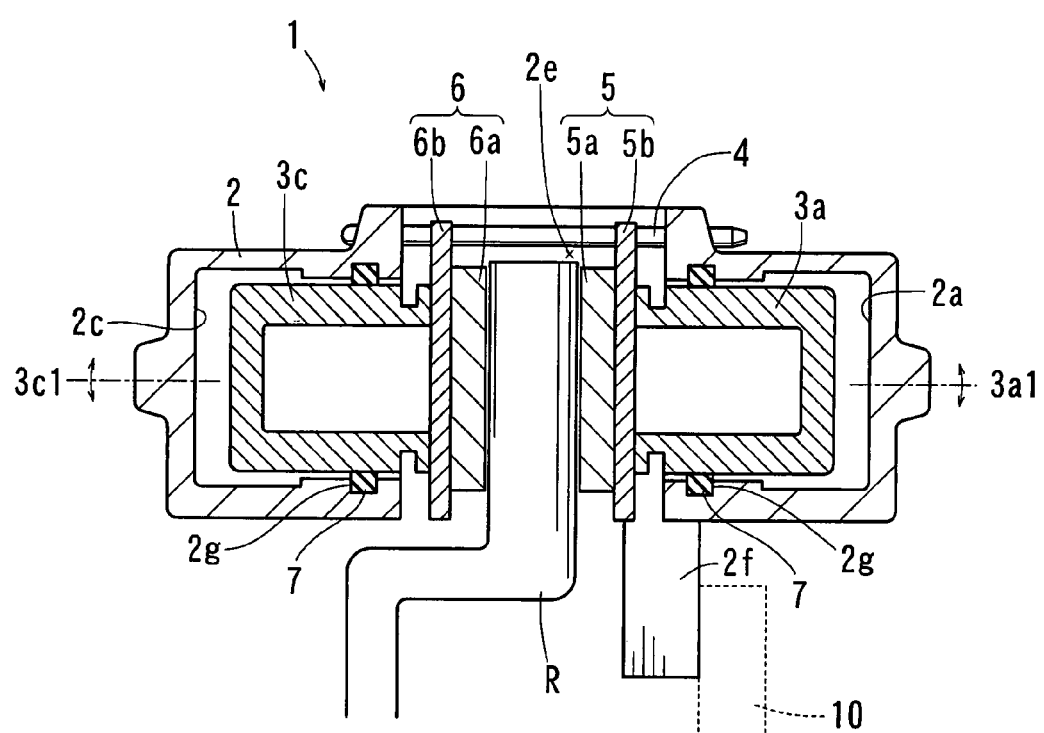
FIG. 2 is a cross-sectional view taken along line II-II in FIG. 1.

A configuration of the invention is described with reference to FIGS. 1 to 4. A disc brake 1 is a piston opposed type disc brake, as shown in FIGS. 1 and 2. The disc brake 1 includes a pair of pads 5 and 6, a plurality of pistons 3a to 3d, and a caliper 2 having a plurality of cylinders (or pots) 2a to 2d for accommodating the pistons 3a to 3d.

As shown in FIG. 2, the pads 5 and 6 can be integrally provided with friction members 5a and 6a for establishing frictional forces between themselves and a disc rotor R, and back plates 5b and 6b for supporting the back faces of the friction members 5a and 6a. The pads 5 and 6 are inserted into the caliper 2 from an opening 2*e* formed at the center of the outer circumference of the caliper 2, and are arranged on the vehicle side (or the righthand side) and the vehicular outer side (or the lefthand side) of the disc rotor R. Into the upper portions of the pads 5 and 6, there are inserted a pair of hanger pins 4, which are supported at their two end portions by the caliper 2 so that the pads 5 and 6 are so mounted on the caliper 2 as to move in the rotor axis direction.

The caliper 2 has a mounted portion 2*j*, at which it is mounted on a vehicle side member 10, as shown in FIG. 2. And the caliper 2 straddles the disc rotor R in the rotor axis direction from the vehicle side. On the inner side portion of the caliper 2 (or on the vehicle side portion), as shown in FIG. 1, there are juxtaposed the cylinders 2*a* and 2*b*, into which the pistons 3*a* and 3*b* for pushing the pad 5 toward the disc rotor R are inserted. On the outer side portion (or the vehicular outer side portion) of the caliper 2, there are juxtaposed the cylinders 2*c* and 2*d*, into which the pistons 3*c* and 3*d* for pushing the pad 6 to the disc rotor R are inserted.

Figure 3:
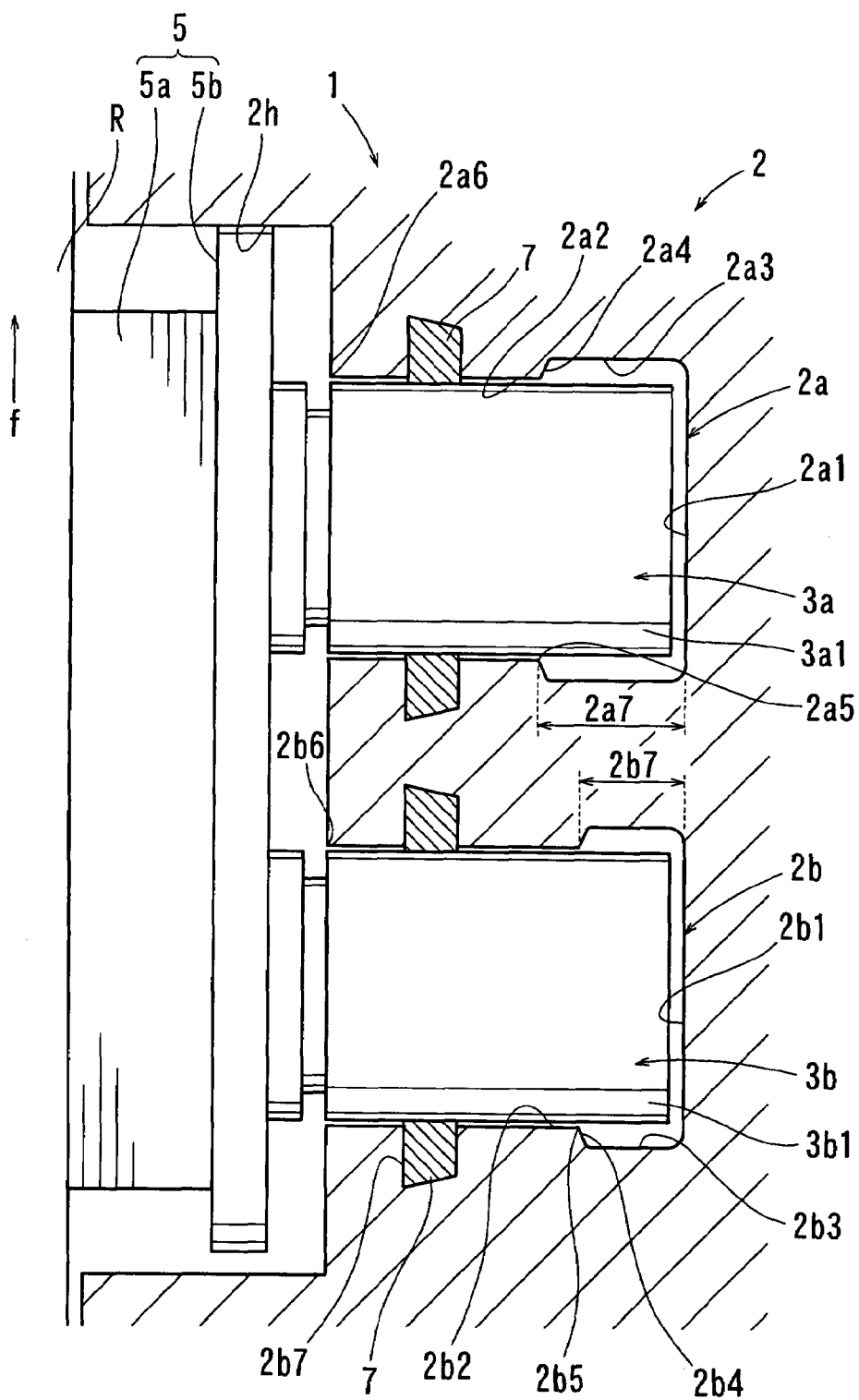
FIG. 3 is a cross-sectional view of the upper part of the disc brake.

As shown in FIG. 3, the inner side cylinders 2*a* and 2*b* are cylindrical holes having bottoms 2*a*1 and 2*b*1 and inner circumferences 2*a*2 and 2*b*2. In the areas of the inner circumferences 2*a*2 and 2*b*2 close to the bottoms 2*a*1, there are formed grooves 2*a*3 and 2*b*3 for enlarging the cylinder diameters. The grooves 2*a*3 and 2*b*3 are formed relatively radially deep so that the bottoms 3*a*1 and 3*b*1 of the pistons 3*a* and 3*b* may avoid sliding contact with the inner circumferences 2*a*2 and 2*b*2.

The two grooves 2*a*3 and 2*b*3 have substantially equal diameters, as shown in FIG. 3. The axial length 2*b*7 of the groove 2*b*3 from the bottom 2*b*1 is shorter than the axial length 2*a*7 of the groove 2*a*3 from the bottom 2*a*1 so that the length 2*b*7 is two thirds or less and one half or more of the length 2*a*7. Steps are formed of the grooves 2*a*3 and 2*b*3 in the inner circumferences 2*a*2 and 2*b*2 of the cylinders 2*a* and 2*b*, thereby forming slopes 2*a*4 and 2*b*4 between crests 2*a*5 and 2*b*5 of the steps and the grooves 2*a*3 and 2*b*3.

Figure 4:
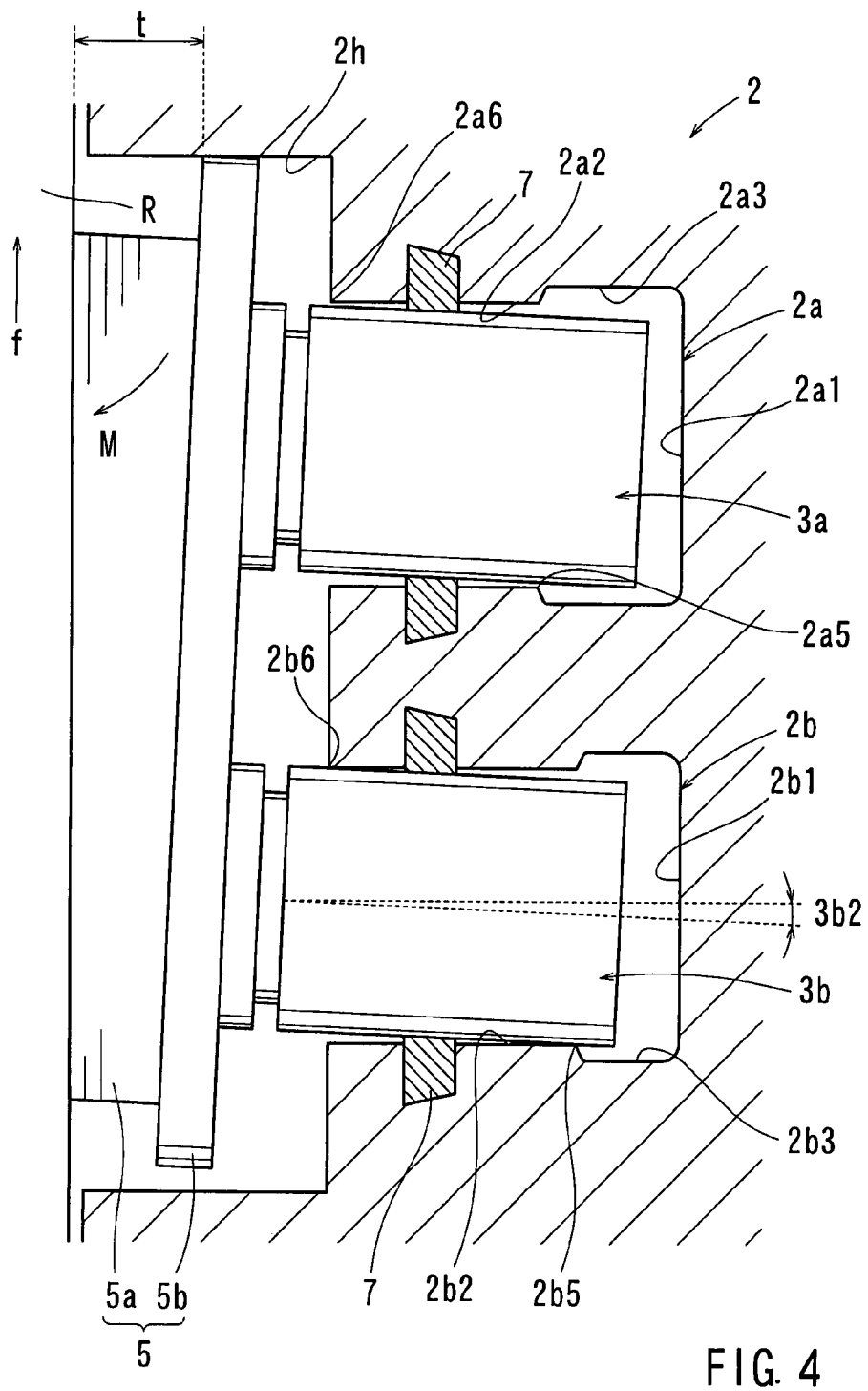
FIG. 4 is a cross-sectional view of the upper part of the disc brake in case wears of a pad is uneven.
Figure 5:
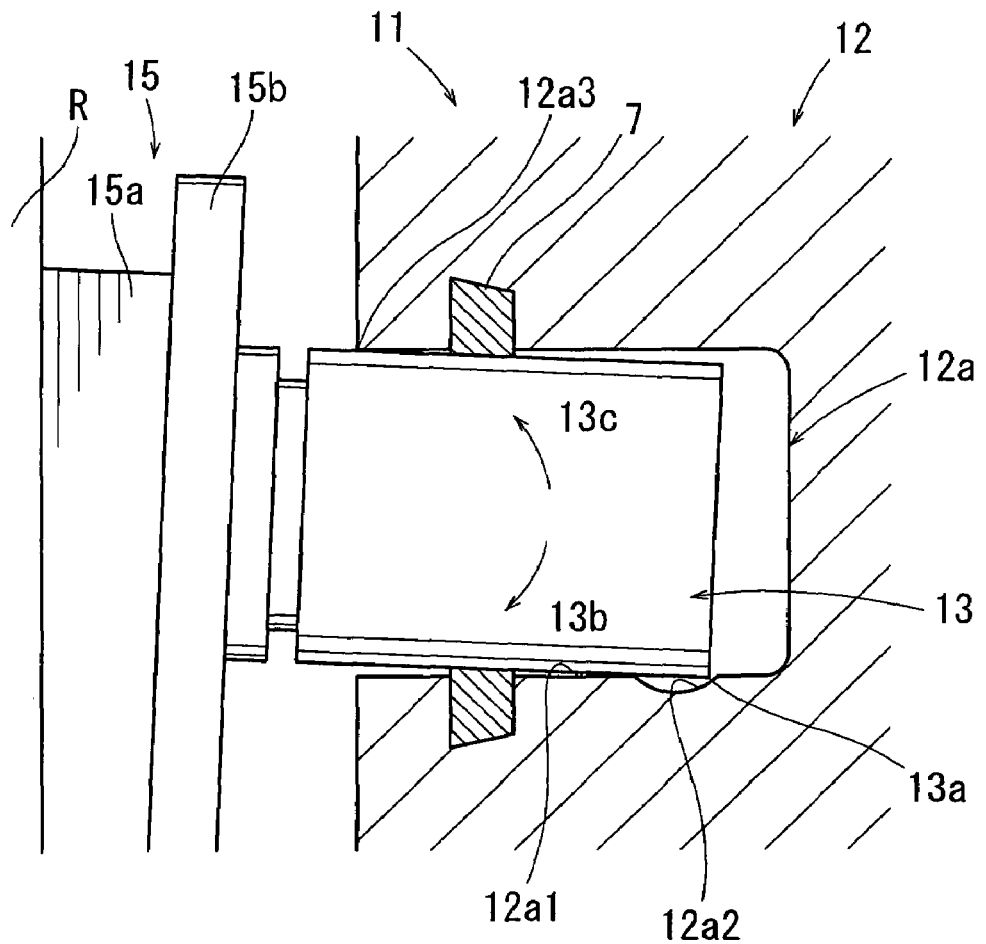
FIG. 5 is a cross-sectional view of a cylinder of a conventional disc brake and a top enlarged view of a piston and a pad of the conventional disc brake.

As shown in FIG. 4, the allowable inclination angles (or the degrees of freedom) of the pistons 3*a* and 3*b* accommodated in the cylinders 2*a* and 2*b* are determined by the respective two points of the crests 2*a*5 and 2*b*5 and insertion openings 2*a*6 and 2*b*6 of the cylinders 2*a* and 2*b*. As the grooves 2*a*3 and 2*b*3 have smaller axial lengths, the allowable inclination angles (or the degrees of freedom) of the pistons 3*a* and 3*b* become the smaller. As a result, the allowable inclination angle 3*b*2 of piston 3*b* is smaller than that of the piston 3*a*.

In the areas of the cylinders 2*a* and 2*b* close to the insertion openings 2*a*6 and 2*b*6, as shown in FIG. 3, there are formed recesses 2*a*7 and 2*b*7, in which seal members 7 are fitted. These seal members 7 can be formed of an elastic material (e.g., rubber) and into an annular shape for sealing the clearances between the inner circumferences 2*a*2 and 2*b*2 of the cylinders 2*a* and 2*b* and the outer circumferences of the pistons 3*a* and 3*b*. The seal members 7 are elastically deformed at braking time by the movements of the pistons 3*a* and 3*b* toward the disc rotor R, and are elastically returned after the braking time to restore the positions of the pistons 3*a* and 3*b* before the braking actions.

When the liquid pressures in the cylinders 2*a* and 2*b* are raised, the pistons 3*a* and 3*b* protrude toward the disc rotor R, as shown in FIG. 4, to push the pad 5 to the disc rotor R. The pad 5 will move in the rotating direction (or upward of FIG. 3) of the disc rotor R, but its movement is restricted by a torque receiving portion 2*h* formed in the caliper 2. In the sliding contact portion between the pad 5 and the disc rotor R, therefore, a frictional force f occurs and generates the braking force. And an end of the pad 5 will abut against the torque receiving portion 2*h*. The end of the pad 5 is spaced by t in the axial direction from the sliding contact portion, so that a torque of M=f*t is applied to the pad 5. As a result, a bearing pressure of the pad 5 on the disc rotor R has a tendency to become higher on the rotor rotation-inlet side than on the rotor rotation-outlet side. Thereby it causes an uneven wear in the pad 5.

On the contrary, according to this aspect of the present invention as shown in FIG. 4, the piston 3*b* is made to have a lower degree of freedom than the other piston 3*a*. As a result, the inclination of the pad 5 with respect to the disc rotor R is suppressed by the piston 3*b* so that the uneven wear of the pad 5 can be suppressed. On the other hand, the piston 3*b* can be prevented from rubbing the cylinder 2*a*. After the braking time, therefore, the pad 5 can easily restore to its position before braking.

The cylinders 2*c* and 2*d* on the outer side are formed like the inner side cylinders 2*a* and 2*b* to have grooves individually. Moreover, the groove of the cylinder 2*d* is made to have a shorter axial length than that of the groove of the cylinder 2*c*. As a result, the degree of freedom of the piston 3*d* has a smaller degree of freedom than that of the piston 3*c*.

Thus, all the cylinders 2*a* and 2*b* (2*c* and 2*d*) are formed, as shown in FIG. 3, such that the grooves 2*a*3 and 2*b*3 for enlarging the cylinder diameters are formed close to the bottoms 2*a*1 and 2*b*1. Moreover, the groove 2*b*3 of the cylinder 2*b* (2*d*) is made shorter than the groove 2*a*3 of the other cylinder 2*a* (2*c*) from the bottoms 2*a*1 and 2*b*1 of the cylinders 2*a* and 2*b* (2*c* and 2*d*), so that the piston 3*b* (3*d*), inserted into the cylinder 2*b* (2*d*) and having groove 2*b*3, has a smaller allowable inclination angle with respect to the caliper 2 than that of the piston 3*a* (3*c*) inserted into the other cylinder 2*a* (2*c*).

As a result, the pistons 3*a* and 3*b* (3*c* and 3*d*) are adjusted in the allowable inclination angles by the axial lengths of the grooves 2*a*3 and 2*b*3 formed in the cylinders 2*a* and 2*b* (2*c* and 2*d*). Moreover, the piston 3*b* (3*d*) having the smallest allowable inclination angle (or degree of freedom), can suppress the inclination of the pad 5. As a result, that piston 3*b* (3*d*) can suppress the uneven wear of the pad 5. On the other hand, the other piston 3*a* (3*c*) hardly rubs the cylinder 2*a* (2*c*) so that the pistons 3*a* and 3*b* (3*c* and 3*d*) can restore the pre-braking position more easily after the braking time, as compared to the case where all of a plurality of the pistons rub the cylinders. As a result, it is possible to suppress the dragging phenomenon of the pads 5 by the disc rotor R.

Moreover, the grooves 2*a*3 and 2*b*3 are formed in the areas close to the bottoms 2*a*1 and 2*b*1 of the cylinders 2*a* and 2*b* (2*c* and 2*d*). The grooves 2*a*3 and 2*b*3 prevent the bottoms 2*a*1 and 2*b*1 of the pistons 3*a* and 3*b* (3*c* and 3*d*) from coming into sliding contact with the inner circumferences 2*a*2 and 2*b*2 of the cylinders 2*a* and 2*b* (2*c* and 2*d*). In the inner circumferences 2*a*2 and 2*b*2 of the cylinders 2*a* and 2*b* (2*c* and 2*d*), therefore, the pit is not formed, which might otherwise make the pistons 3*a* and 3*b* (3*c* and 3*d*) hard to move. Thus, it is possible to suppress the dragging phenomenon of the pads 5 by the disc rotor R. Moreover, the allowable inclination angle of the pistons 3*a* and 3*b* (3*c* and 3*d*) can be adjusted by the grooves 2*a*3 and 2*b*3. This makes it unnecessary to enlarge the clearances between the side of the insertion openings of the cylinders 2*a* and 2*b* (2*c* and 2*d*) and the pistons 3*a* and 3*b* (3*c* and 3*d*). Therefore, the durability of the seal members 7 for sealing that clearance is not degraded.

In the pistons 3*a* and 3*b* (3*c* and 3*d*), the allowable inclination angles with respect to the caliper 2 are determined, as shown in FIG. 3, by the two points of the crests 2*a*5 and 2*b*5 of the steps formed by the grooves 2*a*3 and 2*b*3 of the cylinders 2a and 2b (2c and 2d) and the insertion openings 2a6 and 2b6 of the cylinders 2a and 2b (2c and 2d) for inserting the pistons 3a and 3b (3c and 3d). Moreover, the allowable inclination angles do not depend on the thickness of the friction member 5a of the pad 5. In other words, the allowable inclination angles are unvaried from the new state to the fully worn state of the friction member 5a.

Specifically, the allowable inclination angles of the pistons 3a and 3b (3c and 3d) are unvaried from the new state to the fully worn state of the friction member 5a. Moreover, even in case the crests 2a5 and 2b5 of the steps are chipped by the pistons 3a and 3b (3c and 3d), the pistons 3a and 3b (3c and 3d) are not largely inclined as a result of chipped crests 2a5 and 2b5, even when their outer circumferences slide on the crests 2a5 and 2b5.

As shown in FIG. 1, the caliper 2 includes the inner-side cylinders 2a and 2b and the outer-side cylinders 2c and 2d. Moreover, the groove 2b3 formed in the inner-side cylinder 2a is made shorter in the axial direction than the groove 2a3 formed in the inner-side cylinder 2a, and the groove formed in the outer-side cylinder 2d is made shorter in the axial direction than the groove formed in the other outer-side cylinder 2c. As a result, the development of the uneven wear of the pad 5 can be suppressed on both the outer side and the inner side. Moreover, the durability of the seals between the cylinders 2a to 2d and the pistons 3a to 3d is not deteriorated, but the dragging phenomenon of the pads 5 by the disc rotor R can be suppressed.

While the invention has been described with reference to specific configurations, it will be apparent to those skilled in the art that many alternatives, modifications and variations may be made. Accordingly, the present invention is intended to embrace all such alternatives, modifications and variations that may fall within the spirit and scope of the appended claims. For example, the present invention should not be limited to the representative configurations, but may be modified as described below.

In FIGS. 1 to 4, the configuration is applied to the piston opposed type disc brake. However, the configuration may be applied to a floating type disc brake. The floating type disc brake includes a mount on a vehicle side, a caliper straddling a disc rotor mounted movably on the mount, and a plurality of pistons inserted into a plurality of cylinders formed in juxtaposition in the vehicle-side portion of the caliper. Pads arranged on the inner side are pushed to the disc rotor by the pistons, and the outer-side pad is pushed to the disc rotor by pawls formed on the vehicular outer side of the caliper.

In FIGS. 1 to 4, the paired pistons and the paired cylinders are individually disposed on the inner side and on the outer side. In another configuration, however, three or more pistons and cylinders may be individually disposed on the inner side and on the outer side. In the areas close to the bottoms of the cylinders, moreover, there may be formed grooves, one of which is shorter in the axial direction than those of the remaining cylinders.

This invention claims:

1. A disc brake comprising:
a first and second piston capable of pushing a pad towards a disc rotor; and
a caliper having a first and second cylinder for housing the first and second pistons, wherein:
the first and second cylinders are disposed on the same of the disc rotor,
the first and second pistons push the pad in substantially the same direction, and
each first and second cylinder includes a bottom and a groove positioned proximate the bottom, further wherein the groove on the first cylinder is smaller than the groove on the second cylinder in the axial direction, further wherein the first piston associated with the first cylinder has a smaller allowable inclination angle for the caliper than the second piston.

2. The disc brake as in claim 1, wherein the grooves includes a step having a crest.

3. The disc brake as in claim 2, wherein the first and second cylinder define insertion openings for inserting the first and second piston.

4. The disc brake as in claim 3, wherein the allowable inclination angles of the first and second piston with respect to the caliper are determined by a position of the crest and the insertion openings.

5. The disc brake as in claim 4, wherein the allowable inclination angles do not depend on thickness of friction member of the pad.

6. The disc brake as in claim 1, further including a sealing member positioned between an inner circumference of the first and second cylinder and an outer circumference of the first and second piston.

7. The disc brake as in claim 6, wherein the sealing member is made of rubber.

8. The disc brake as in claim 1, wherein a length of the groove on the first cylinder is between two thirds and one half a length of the groove on the second cylinder.

9. A disc brake comprising:
a plurality of pistons capable of pushing a pad towards a disc rotor; and
a caliper having a plurality of cylinders for housing the pistons, wherein:
the plurality of cylinders are disposed on the same side of the disc rotor,
the plurality of pistons push the pad in substantially the same direction, and
each of the plurality of cylinders includes a bottom and a groove positioned proximate to the bottom for enlarging each of the plurality of cylinders diameter, further wherein the groove on one of the plurality of cylinders is smaller than another groove on another of the plurality of cylinders in the axial direction from the bottom, so that one of the plurality of pistons associated with the one of the plurality of cylinders having the smaller groove has a smaller allowable inclination angle for the caliper than another of the plurality of pistons.

10. The disc brake as in claim 1, wherein the allowable inclination angles of the plurality of pistons with respect to the caliper are determined by two points of crests of steps formed by the grooves of the plurality of cylinders and insertion openings of the plurality of cylinders for inserting the pistons, and the allowable inclination angles do not depend on thickness of friction member of the pad.

11. A disc brake comprising:
a plurality of inner-side pistons capable of pushing an inner-side pad towards a disc rotor, the inner-side pad is positioned closer to a vehicle side than the disc rotor;
a plurality of outer-side pistons capable of pushing an outer-side pad towards the disc rotor, the outer-side pad is positioned outer than the disc rotor; and
a caliper having a plurality of inner-side cylinders for housing the inner-side pistons and a plurality of outer-side cylinders for housing the outer-side pistons, wherein:
the plurality of inner-side pistons push the inner-side pad in substantially the same direction,
the plurality of outer-side pistons push the outer-side pad in substantially the same direction, and each of the inner-side and outer-side cylinders has a bottom and a groove positioned proximate to the bottom for enlarging the cylinder diameter, the groove on one of the plurality of inner-side cylinders is smaller than another groove on another of the plurality of inner-side cylinders in the axial direction from the bottom, so that one of the plurality of the inner-side pistons associated with the one of the plurality of inner-side cylinders having the smaller groove has a smaller allowable inclination angle for the caliper than another of the plurality of inner-side pistons, and the groove on one of the plurality of outer-side cylinders is smaller than another groove of another of the plurality of outer-side cylinders in the axial direction from the bottom, so that one of the plurality of the outer-side pistons associated with the one of the plurality of outer-side cylinders having the smaller groove has a smaller allowable inclination angle for the caliper than another of the plurality of outer-side pistons.

* * * * *